United States Patent
Kisley et al.

(10) Patent No.: US 10,382,199 B2
(45) Date of Patent: Aug. 13, 2019

(54) KEYWORD TO SET MINIMUM KEY STRENGTH

(71) Applicant: International Business Machines Corporation, Armonk, NY (US)

(72) Inventors: Richard V. Kisley, Charlotte, NC (US); Michael J. Miele, Concord, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 210 days.

(21) Appl. No.: 15/283,122

(22) Filed: Sep. 30, 2016

(65) Prior Publication Data

US 2018/0097620 A1  Apr. 5, 2018

(51) Int. Cl.
  *H04L 29/06* (2006.01)
  *H04L 9/08* (2006.01)
  *H04L 9/14* (2006.01)

(52) U.S. Cl.
  CPC ............ *H04L 9/088* (2013.01); *H04L 9/14* (2013.01)

(58) Field of Classification Search
  CPC ................................. H04L 9/14; H04L 9/088
  See application file for complete search history.

(56) References Cited

U.S. PATENT DOCUMENTS

| 2005/0114673 A1* | 5/2005 | Raikar ............... G06F 21/46 713/182 |
| 2007/0250713 A1* | 10/2007 | Rahman ............ H04L 63/162 713/171 |
| 2012/0281839 A1 | 11/2012 | Arnold et al. |

* cited by examiner

*Primary Examiner* — Harunur Rashid
(74) *Attorney, Agent, or Firm* — Cantor Colburn LLP; William Kinnaman

(57) ABSTRACT

Embodiments are directed to a computer-implemented method and system, and for setting a minimum key strength in a key hierarchy. The method and system can include the use of a key strength keyword that set a minimum key strength for a plurality of key classes. The setting of a key strength lower than that set forth in the key strength command is prohibited. The key classes can include DES keys, AES keys, HMAC keys, RSA PKI keys, RSA usage keys, RSA key generation keys, ECC PKI keys, ECC usage keys, and ECC key generation keys. A multi-dimension key hierarchy, including a master key and a key that is derived through the use of a key derivation function is also described herein.

7 Claims, 5 Drawing Sheets

KEYWORD TO SET MINIMUM KEY STRENGTH

BACKGROUND

The embodiments described herein relate in general to the field of encryption. More specifically, the embodiments described herein relate to cryptographic data structures.

Various methods exist in support of electronic data security. Cryptography is the transformation of intelligible information into an apparently unintelligible form in order to conceal the information from unauthorized parties. Cryptography is used for various purposes, such as to protect information transmitted through communications networks or stored on data storage units. Cryptographic procedures can be used not only to protect the privacy of data but also the integrity of data. The cryptographic transformation of data is ordinarily defined by a selected algorithm, or procedure, under the control of a key. Since the algorithm is normally public knowledge, protection of the transformed, or enciphered, data depends on the secrecy of the key. The strength of a key can be key to determining how secure a system is. It can be beneficial to have a certain key strength throughout a system.

SUMMARY

Embodiments are directed to a computer-implemented method of setting a minimum key strength in a system. The method can include receiving, using a processor, a key strength keyword to set a minimum key strength for a plurality of key classes. The method can further include preventing, using the processor, a setting of a key strength lower than that set forth in the key strength command.

Embodiments are further directed to a computer system for setting a minimum key strength. The system includes a memory and a processor system communicatively coupled to the memory. The processor is configured to perform a method that includes receiving, using a processor, a key strength keyword to set a minimum key strength for a plurality of key classes. The method can further include preventing, using the processor, a setting of a key strength lower than that set forth in the key strength command.

Embodiments are further directed to a computer system for managing a hierarchy of keys. The system includes a memory and a processor system communicatively coupled to the memory. The processor system is configured to manage a key hierarchy. The key hierarchy includes a first master key arranged to encrypt, or wrap operational keys in a first key sub-hierarchy. The key hierarchy further includes a derived master key arranged to encrypt or wrap operational keys in a second key sub-hierarchy. The derived master key is derived from the first master key through the use of a key derivation function.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Figure 1:
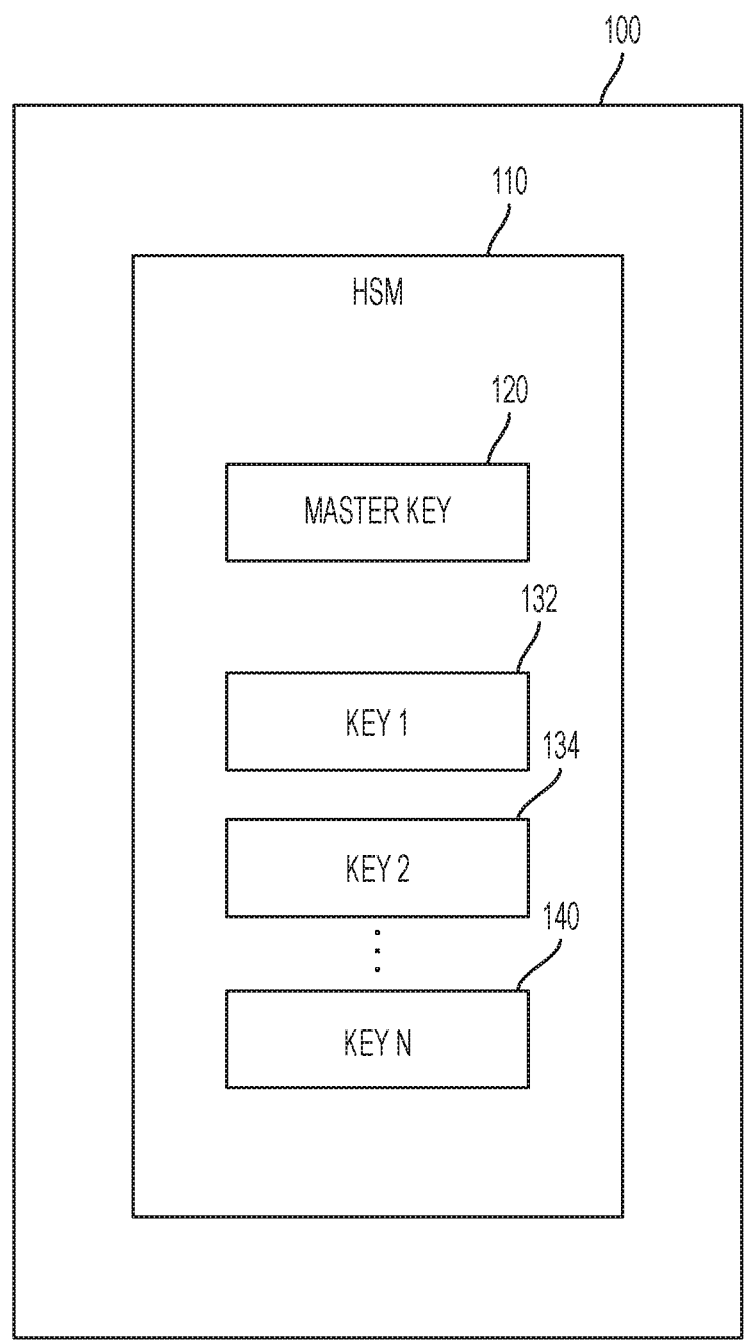
FIG. 1 depicts a block diagram of an exemplary system.

Various embodiments of the present invention will now be described with reference to the related drawings. Alternate embodiments can be devised without departing from the scope of this invention. Various connections might be set forth between elements in the following description and in the drawings. These connections, unless specified otherwise, can be direct or indirect, and the present description is not intended to be limiting in this respect. Accordingly, a coupling of entities can refer to either a direct or an indirect connection.

Additionally, although a detailed description of a computing device is presented, configuration and implementation of the teachings recited herein are not limited to a particular type or configuration of computing device(s). Rather, embodiments are capable of being implemented in conjunction with any other type or configuration of wireless or non-wireless computing devices and/or computing environments, now known or later developed.

Furthermore, although a detailed description of algorithms is included herein, implementation of the teachings recited herein are not limited to embodiments described herein. Rather, embodiments are capable of being implemented in conjunction with any other type of system, now known or later developed.

At least the features and combinations of features described in the immediately present application, including the corresponding features and combinations of features depicted in the figures amount to significantly more than implementing a method and data structure for implementing a minimum key length or having a multi-dimensional key hierarchy. Additionally, at least the features and combinations of features described in the immediately preceding paragraphs, including the corresponding features and combinations of features depicted in the figures go beyond what is well understood, routine and conventional in the relevant field(s).

Cryptography is the transformation of intelligible information into an apparently unintelligible form in order to conceal the information from unauthorized parties. A common form of cryptography is public-key cryptography, also known as asymmetric cryptography. Public-key cryptography uses a pair of keys, a public key, and a private key. Exemplary forms of public-key cryptography include RSA cryptography and elliptic curve cryptography (EC or ECC).

In common usage, a first user (Alice) has both a public key, that is publicly known and available, and a related private key, which is known only to Alice and was created at the same time as the public key. If another user (Bob), wishes to send a secure message to Alice, he encrypts the message using Alice's public key. The message is encrypted and only can be decrypted by Alice or someone who has Alice's private key. Asymmetric cryptography solves certain problems of symmetric cryptography, such as the fact that a symmetric key has to be in the possession of both the sender and receiver in order to work properly. The problem with that situation is that the public key must be distributed to both Alice and Bob in order to maintain security.

A public/private key pair also can be used to sign messages, in order to prove that the message actually was sent by the sender. In such a case, Alice would sign a message using her private key. Anyone who receives the message can use Alice's public key to verify her signature to confirm it was sent by Alice.

Cryptography is of such importance that there has been a growth in the use of hardware security modules (HSM), physical computing devices that safeguard and manage digital keys for authentication purposes and to provide processing for cryptography functions. Some HSM operate using common cryptographic architecture (CCA), an application programming interface (API) that allows one to obtain services from, and to manage the operation of, a cryptographic system that meets CCA specifications.

In certain systems such as an HSM, there can be a desire to have a minimum strength of the keys used within the system. A minimum strength can mean having a key of a specific length for a certain encryption method. Having the minimum key strength easily configuration also can result in an easier configuration procedure as well as an easier audit procedure (such as when an entity has to prove that it maintains a certain amount of security).

FIG. 1 shows a block diagram of the layout of an exemplary system 100. System 100 includes a hardware security module 110. Within hardware security module 110 is a master key 120. Master key 120 is used to encrypt other keys, such as key 1 (132), key 2 (134), and key N (140). It should be understood that a typical HSM 110 will contain many more keys than the ones illustrated in FIG. 1.

Each of the keys 132, 134, and 140 can be one of a variety of different types of keys. Exemplary key usages include symmetric keys, asymmetric keys, agreement keys, authorization keys, authentication keys, encryption keys, transport keys, public keys, private keys, signature keys, verification keys, key wrapping keys, key encrypting keys, any combination of keys mentioned above, and any other usage type of keys now known or developed in the future. The keys can follow one of many different algorithms, such as data encryption standard (DES or DEA), triple DES (also known as triple DEA) advanced encryption standard (AES), RSA, elliptical curve (EC or ECC), and the like.

To ensure security in the HSM, it can be desirable to set a minimum strength for each key in the HSM. Embodiments provide a data structure that can be used by an entity to set minimum strength for each type of key used in the HSM as well as for any algorithms used in the HSM.

In some embodiments, a new key strength keyword, termed SETSTRNG, can be used to set the minimum key strength in an HSM using common cryptography architecture (CCA) application program interface (API). The SETSTRNG keyword can enable a user to set the minimum key strength for entire classes of keys across an entire domain. This new keyword can be used to set the key strength for all keys in an HSM other than the master key.

Figure 2:
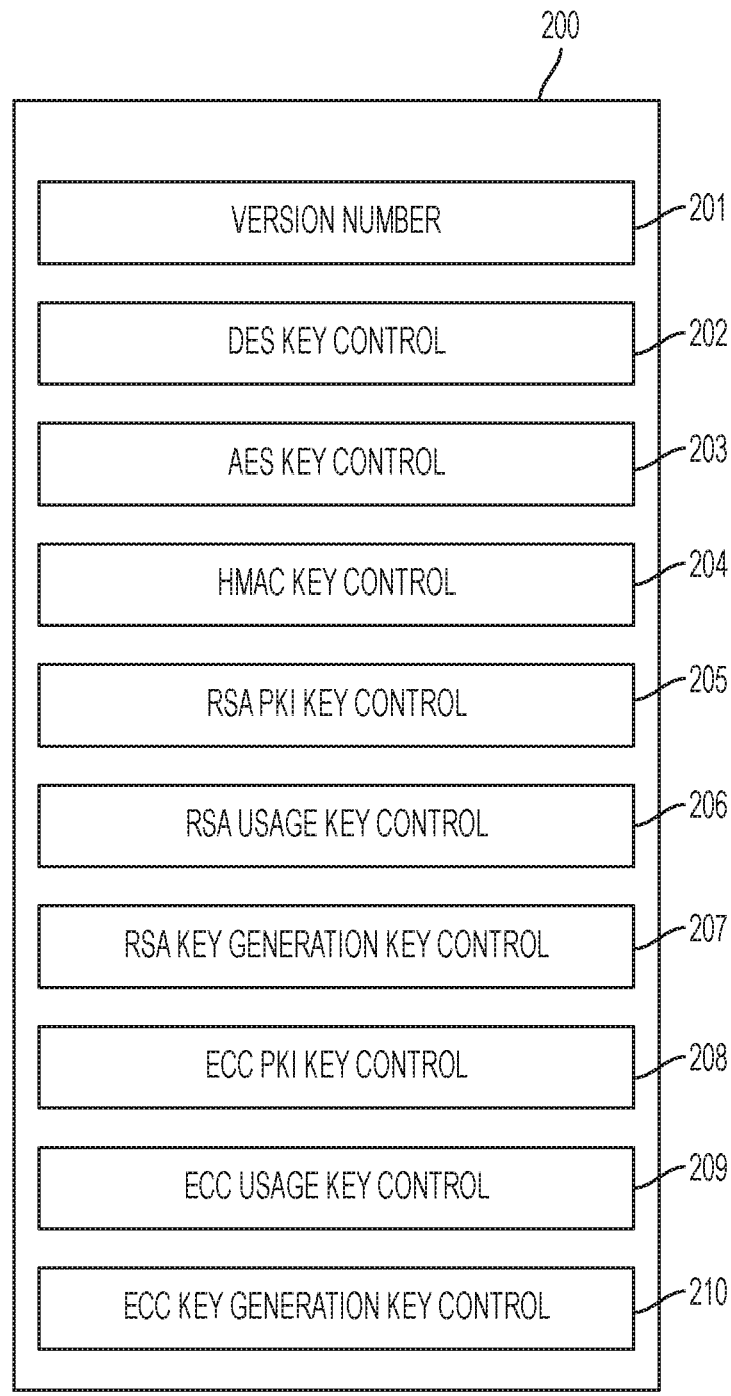
FIG. 2 depicts an overview of an exemplary keyword.

With reference to FIG. 2, a block diagram 200 is presented that presents an overview of a SETSTRNG command. Block diagram 200 represents the fields that can be set or changed in a SETSTRNG command. Block diagram 200 contains 10 fields, labeled 201 through 210. Each field represents a type of key or key class. For each of fields 201 through 210, the minimum strength of the key is noted in the field. In an exemplary embodiment, field 201 is used for the version number, field 202 is used for DES key control, field 203 is used for AES key control, field 204 is used for HMAC key control, field 205 is used for RSA PKI key control, field 206 is used for RSA usage key control, field 207 is used for RSA key generation key control, field 208 is used for ECC PKI key control, field 209 is used for ECC usage key control, and field 210 is used for ECC key generation key control.

In some embodiments, each of fields 201 through 209 is four-bytes in length. In some embodiments, each of fields 201 through 209 is in big-endian format. In some embodiments, it may not be necessary for every field in the structure to be active. In other words, if there is a 1 in the highest order bit of the field (0x80000000), that indicates a change to the field. If there is a zero in the highest order bit, that indicates no change to the field. In some embodiments, if there is a zero in the highest order bit, the remaining bits in the field are also zero (0x00000000). The remainder of the field is a bit-map, where each bit position can indicate whether or not a certain usage is allowed for a certain key class.

In some embodiments, if there is a restriction for a certain strength for a certain application (e.g., DES PIN, AES MAC, or RSA Sign), this impacts all verbs that would normally accept that key type.

In some embodiments, where a key of a certain strength is allowed or restricted, this impacts the key generation, import, and export of keys of that algorithm and strength.

In some embodiments, for each given bit position, if the value of that bit is a binary 1, then the noted control item is allowed.

With reference to Table 1, an exemplary layout is presented for each bit position. Table 1 expands on block diagram 200, giving specific bit positions for each restriction. For the most part, Table 1 is self-explanatory. However, certain fields will be explained in more detail for exemplary purposes.

Several fields implement a bit hierarchy, where a few high-level bits control key usage and creation for a given strength across all APIs, while other bits implement specific controls. Such a scheme is known as a permissions hierarchy, where if a given key strength is allowed, you can still lock down specific uses of that key strength to a fairly narrow range.

For example, the DESKC_ANY_ALLOW_56BIT field is to be on if any use of 56-bit DES keys is allowed. After that, one can selectively control key types and use cases with the specific usage bits. For example, consider a user that wishes to allow 112-bit TDES keys for any processing and to allow 56-bit DES keys for only 3624 PIN block PIN verification processing. That user should pass a value in field 2 of 0Xbaa80000. The following bits are set: 0x80000000 high order bit to signify a change in this field; 0x20000000 DESKC_ANY_ALLOW_112BIT to indicate base 112-capability; 0x10000000 DESKC_ANY_ALLOW_56BIT to indicate base 56-bit capability; 0x08000000 DESKC_PIN_ALLOW_112BIT; 0x02000000 DESKC_PIN3624VER_ALLOW_56BIT to indicate that 56-bit DES keys for 3624 PIN block PIN verification processing; 0x00800000 DESKC_ENC_ALLOW_112BIT; 0x00200000 DESKC_MAC_ALLOW_112BIT; 0x00080000 DESKC_KM_ALLOW_112BIT.

In addition to a SETSTRNG command to set the allowed key strengths, there can also be a GETSTRNG that is configured to return the currently allowed key strengths. Each field returned in a GETSTRNG command can have values such as those set forth in Table 1 and FIG. 2.

Returning to FIG. 1, the keys within HSM 110 can be referred to as a "key hierarchy." Master key 120 protects all keys in HSM 110 (keys 132, 134, and 140), as well as any keys stored externally in a key data store (KDS).

A drawback of such an approach is that some systems can have different hierarchies of keys. For example, there can be a set of keys that are valid only for certain older uses, while newer systems added to the control of HSM 110 can have a different set of keys. Under the system of FIG. 1, there would need to be a separate master key for each intended usage.

Figure 3:
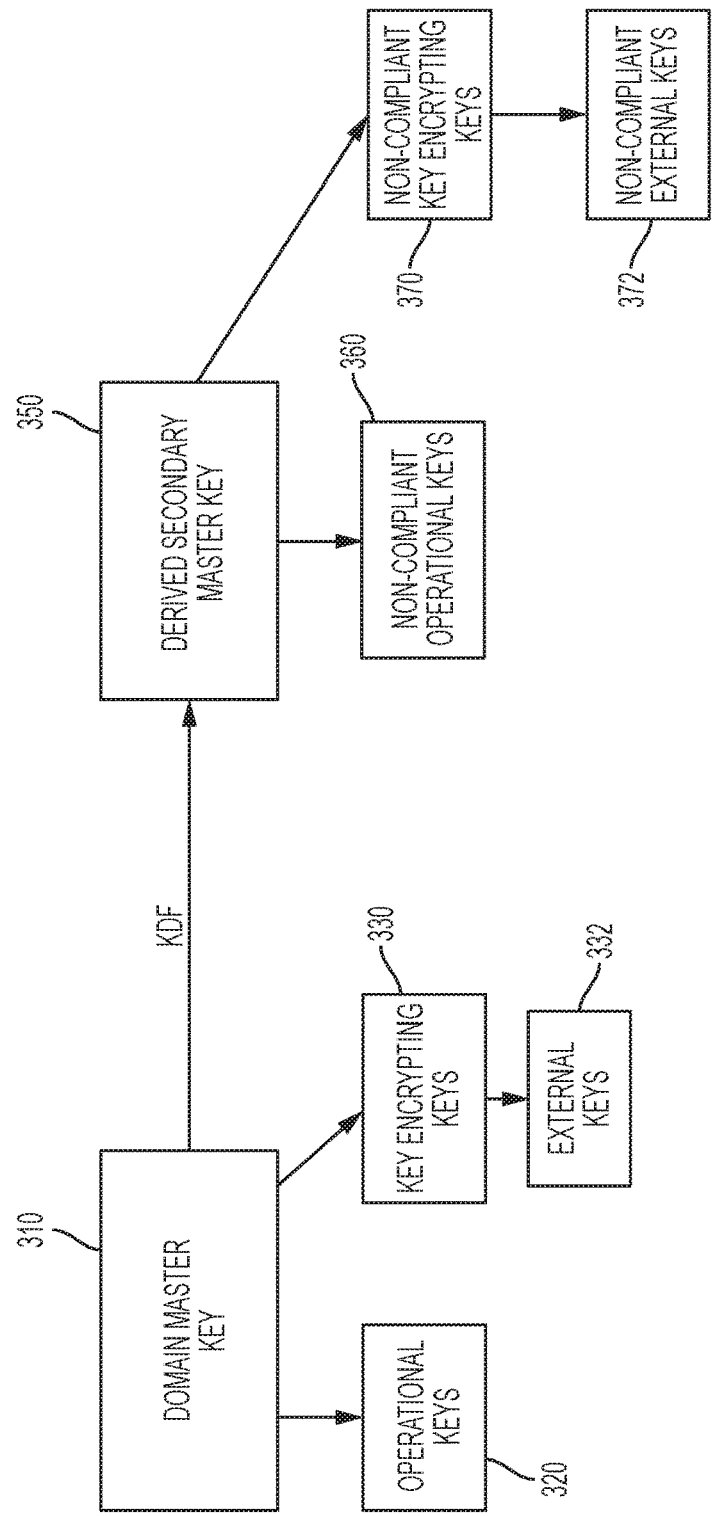
FIG. 3 depicts an overview of a secondary key hierarchy.

Under an embodiment of the present invention, there can be a secondary key hierarchy that does not require a separate master key. With reference to FIG. 3, a multi-dimensional key hierarchy 300 is presented. Multi-dimensional key hierarchy 300 can be used in an HSM, such as HSM 110 from FIG. 1.

Multi-dimensional key hierarchy 300 includes a master key 310. Master key 310 is used to encrypt, or wrap operational keys 320. Master key 310 is also used to wrap key encrypting keys 330. Key encrypting keys 330 can be used to wrap external keys 332. Each of keys 320, 330, and 332 can be "compliant" keys in that they meet various levels of security. A compliant key is one that complies with a certain standard, such as PCI-HSM. The standards set forth criteria that must be met for a key to be used, such as a specific key wrapping algorithm, minimum key strengths, key generation methods, and key import methods.

If master key 310 is also used to wrap non-compliant keys, it can do so through the use of a key derivation function (KDF) 340. Key derivation function 340 can be any type of KDF now known or developed in the future. The KDF can include a variety of different techniques, such as salting and hashing, to create a new key based off of master key 310. The resulting key is termed derived secondary master key 350. Derived secondary master key 310 is used to wrap non-compliant operational keys 320. Derived secondary master key 310 is also used to wrap non-compliant key encrypting keys 370. Non-compliant key encrypting keys 370 can be used to wrap non-compliant external keys 372. Each of keys 360, 370, and 372 can be "non-compliant" keys. In some embodiments, the non-compliant keys and compliant keys can be reversed, such that the domain master key 310 is used to create non-compliant keys and the derived secondary master key 350 is used to wrap compliant keys. To be generalized, one of the key hierarchies can be called a first sub-hierarchy and the other key hierarchy can be called a second sub-hierarchy.

Figure 4:
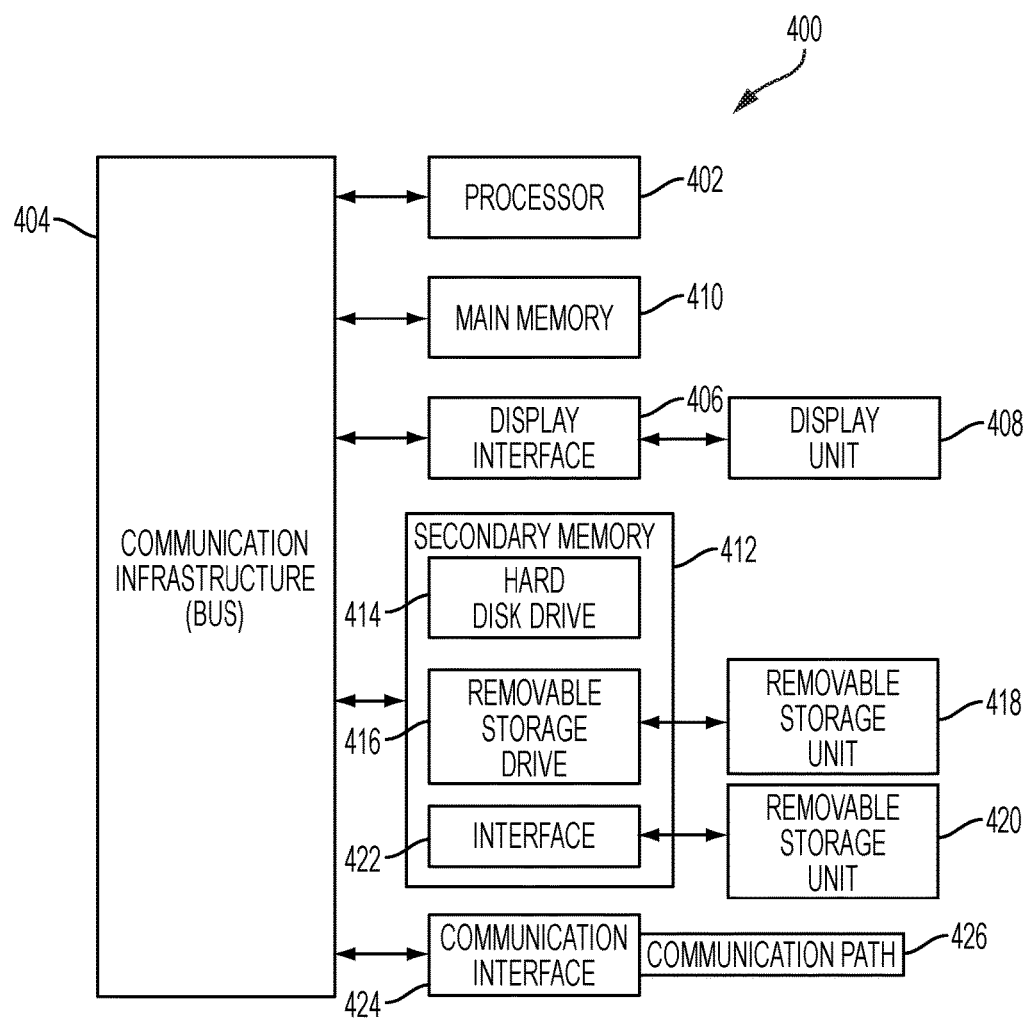
FIG. 4 depicts a computer system capable of implementing hardware components of one or more embodiments.

FIG. 4 depicts a high-level block diagram of a computer system 400, which can be used to implement an HSM in one or more embodiments. More specifically, computer system 400 can be used to implement hardware components of systems capable of performing methods described herein. Although one exemplary computer system 400 is shown, computer system 400 includes a communication path 426, which connects computer system 400 to additional systems (not depicted) and can include one or more wide area networks (WANs) and/or local area networks (LANs) such as the Internet, intranet(s), and/or wireless communication network(s). Computer system 400 and additional system are in communication via communication path 426, e.g., to communicate data between them.

Computer system 400 includes one or more processors, such as processor 402. Processor 402 is connected to a communication infrastructure 404 (e.g., a communications bus, crossover bar, or network). Computer system 400 can include a display interface 406 that forwards graphics, textual content, and other data from communication infrastructure 404 (or from a frame buffer not shown) for display on a display unit 408. Computer system 400 also includes a main memory 410, preferably random access memory (RAM), and can also include a secondary memory 412. Secondary memory 412 can include, for example, a hard disk drive 414 and/or a removable storage drive 416, representing, for example, a floppy disk drive, a magnetic tape drive, or an optical disc drive. Hard disk drive 414 can be in the form of a solid-state drive (SSD), a traditional magnetic disk drive, or a hybrid of the two. There also can be more than one hard disk drive 414 contained within secondary memory 412. Removable storage drive 416 reads from and/or writes to a removable storage unit 418 in a manner well known to those having ordinary skill in the art. Removable storage unit 418 represents, for example, a floppy disk, a compact disc, a magnetic tape, or an optical disc, etc. which is read by and written to by removable storage drive 416. As will be appreciated, removable storage unit 418 includes a computer-readable medium having stored therein computer software and/or data.

In alternative embodiments, secondary memory 412 can include other similar means for allowing computer programs or other instructions to be loaded into the computer system. Such means can include, for example, a removable storage unit 420 and an interface 422. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 420 and interfaces 422 which allow software and data to be transferred from the removable storage unit 420 to computer system 400.

Computer system 400 can also include a communications interface 424. Communications interface 424 allows software and data to be transferred between the computer system and external devices. Examples of communications interface 424 can include a modem, a network interface (such as an Ethernet card), a communications port, or a PC card slot and card, a universal serial bus port (USB), and the like. Software and data transferred via communications interface 424 are in the form of signals that can be, for example, electronic, electromagnetic, optical, or other signals capable of being received by communications interface 424. These signals are provided to communications interface 424 via communication path (i.e., channel) 426. Communication path 426 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 410 and secondary memory 412, removable storage drive 416, and a hard disk installed in hard disk drive 414. Computer programs (also called computer control logic) are stored in main memory 410 and/or secondary memory 412. Computer programs also can be received via communications interface 424. Such computer programs, when run, enable the computer system to perform the features discussed herein. In particular, the computer programs, when run, enable processor 402 to perform the features of the computer system. Accordingly, such computer programs represent controllers of the computer system. Thus it can be seen from the forgoing detailed description that one or more embodiments provide technical benefits and advantages.

Figure 5:
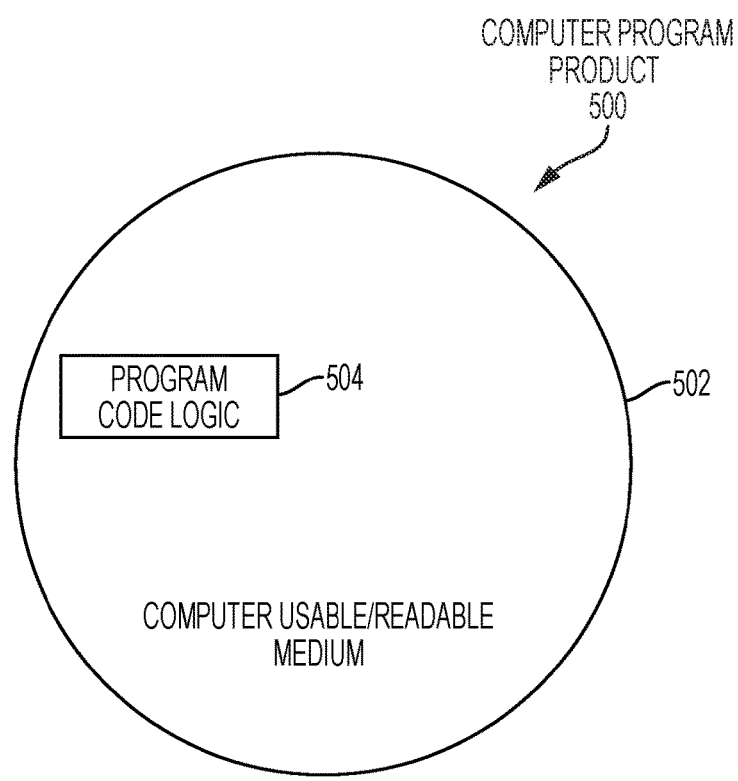
FIG. 5 depicts a diagram of a computer program product according to one or more embodiments.

Referring now to FIG. 5 a computer program product 500 in accordance with an embodiment that includes a computer-readable storage medium 502 and program instructions 504 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for setting a minimum key strength in a key hierarchy in a hardware security module (HSM), the method comprising:
   receiving, using a processor, a key strength keyword to set a minimum key strength for a plurality of key classes; and
   preventing, using the processor, a setting of a key strength lower than the minimum key strength, wherein the key strength keyword comprises, for each key class in the plurality of key classes, a bit-map that indicates which key strengths are allowed for the key class, wherein the key hierarchy comprises:
   a first master key arranged to wrap operational keys in a first key sub-hierarchy, the first key sub-hierarchy comprising one or more compliant keys and key encrypting keys configured to wrap external keys; and
   a derived master key arranged to wrap operational keys in a second key sub-hierarchy, the second key sub-hierarchy comprising one or more non-compliant keys; wherein the derived master key is derived from the first master key through the use of a key derivation function.

2. The computer implemented method of claim 1, wherein:
   the plurality of key classes is selected from the group consisting of: DES keys, AES keys, HMAC keys, RSA PKI keys, RSA usage keys, RSA key generation keys, ECC PKI keys, ECC usage keys, and ECC key generation keys.

3. The computer implemented method of claim 1, wherein:
   a first bit in the bit-map indicates a change to the key strength allowed for the key class.

4. The computer implemented method of claim 1, wherein:
   the key strength keyword is further configured to return a set of bytes that indicate currently allowed key strengths.

5. A computer system for setting a minimum key strength in a key hierarchy in a hardware security module (HSM), comprising:
   a memory; and a processor system communicatively coupled to the memory;

the processor system configured to perform a method comprising:

receiving a key strength keyword to set a minimum key strength for a plurality of key classes; and preventing a setting of a key strength lower than the minimum key strength; wherein:

the plurality of key classes includes: DES keys, AES keys, HMAC keys, RSA PKI keys, RSA usage keys, RSA key generation keys, ECC PKI keys, ECC usage keys, and ECC key generation keys and further wherein the key strength keyword comprises, for each key class in the plurality of key classes, a bit-map that indicates which key strengths are allowed for the key class, wherein the key hierarchy comprises:

a first master key arranged to wrap operational keys in a first key sub-hierarchy, the first key sub-hierarchy comprising one or more compliant keys and key encrypting keys configured to wrap external keys; and a derived master key arranged to wrap operational keys in a second key sub-hierarchy, the second key sub-hierarchy comprising one or more non-compliant keys; wherein the derived master key is derived from the first master key through the use of a key derivation function.

6. The computer system of claim 5, wherein:

a first bit in the bit-map indicates a change to the key strength allowed for the key class.

7. The computer system of claim 5, wherein:

the key strength keyword is further configured to return a set of bytes that indicate currently allowed key strengths.

* * * * *